United States Patent [19]

Hong

[11] Patent Number: 5,627,599

[45] Date of Patent: May 6, 1997

[54] CHROMINANCE SIGNAL PROCESSING APPARATUS FOR DIGITAL TELEVISION RECEIVER

[75] Inventor: Sung-Hoon Hong, Seoul, Rep. of Korea

[73] Assignee: LG Electronics Inc., Seoul, Rep. of Korea

[21] Appl. No.: 547,609

[22] Filed: Oct. 24, 1995

[30]         Foreign Application Priority Data

Oct. 24, 1994 [KR] Rep. of Korea ............... 27128/1994

[51] Int. Cl.$^6$ ........................... H04N 9/70; H04N 9/68
[52] U.S. Cl. ........................ 348/643; 348/647; 348/644
[58] Field of Search ............................ 348/647, 643–646, 348/663, 638, 639, 727, 508; H04N 9/66, 9/70, 9/68, 9/77, 5/455, 9/45, 9/455

[56]          References Cited

FOREIGN PATENT DOCUMENTS 63-309088 12/1988 Japan .
5260505 10/1993 Japan .

*Primary Examiner*—Sherrie Hsia

[57]          ABSTRACT

A chrominance signal processing apparatus for a digital television receiver, comprising an A/D converter for converting a transmitted analog composite video signal into a digital signal in response to a clock frequency, a luminance/chrominance separation circuit for separating luminance and chrominance signals from an output signal from the A/D converter, a delay circuit for delaying the separated luminance signal for a predetermined time period, an ACC circuit for controlling an amplitude of the separated chrominance signal, a chrominance demodulator for detecting color difference signals from an output signal from the ACC circuit, a color killer circuit for detecting a maximum amplitude value of a color burst signal from the separated chrominance signal to generate a color killer signal, a first multiplexing circuit for selecting one of the output signal from the A/D converter and an output signal from the delay circuit in response to the color killer signal, a second multiplexing circuit for selecting the color difference signals or low level signals in response to the color killer signal, a D/A conversion circuit for converting output signals from the first and second multiplexing circuits into analog signals, and a matrix unit for combining output signals from the D/A conversion circuit to produce primary color signals.

35 Claims, 10 Drawing Sheets

F I G. 9
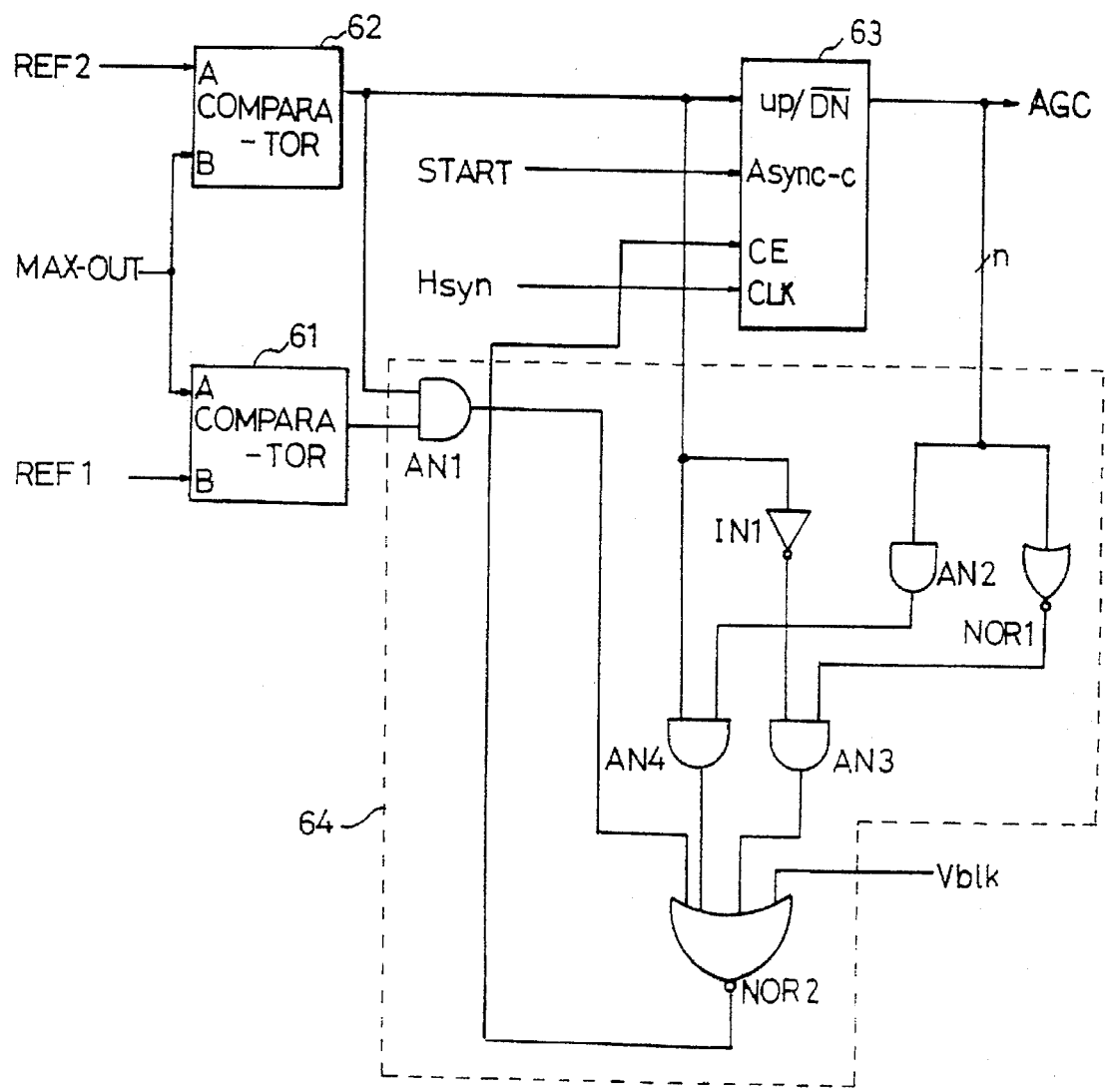

F I G. 11
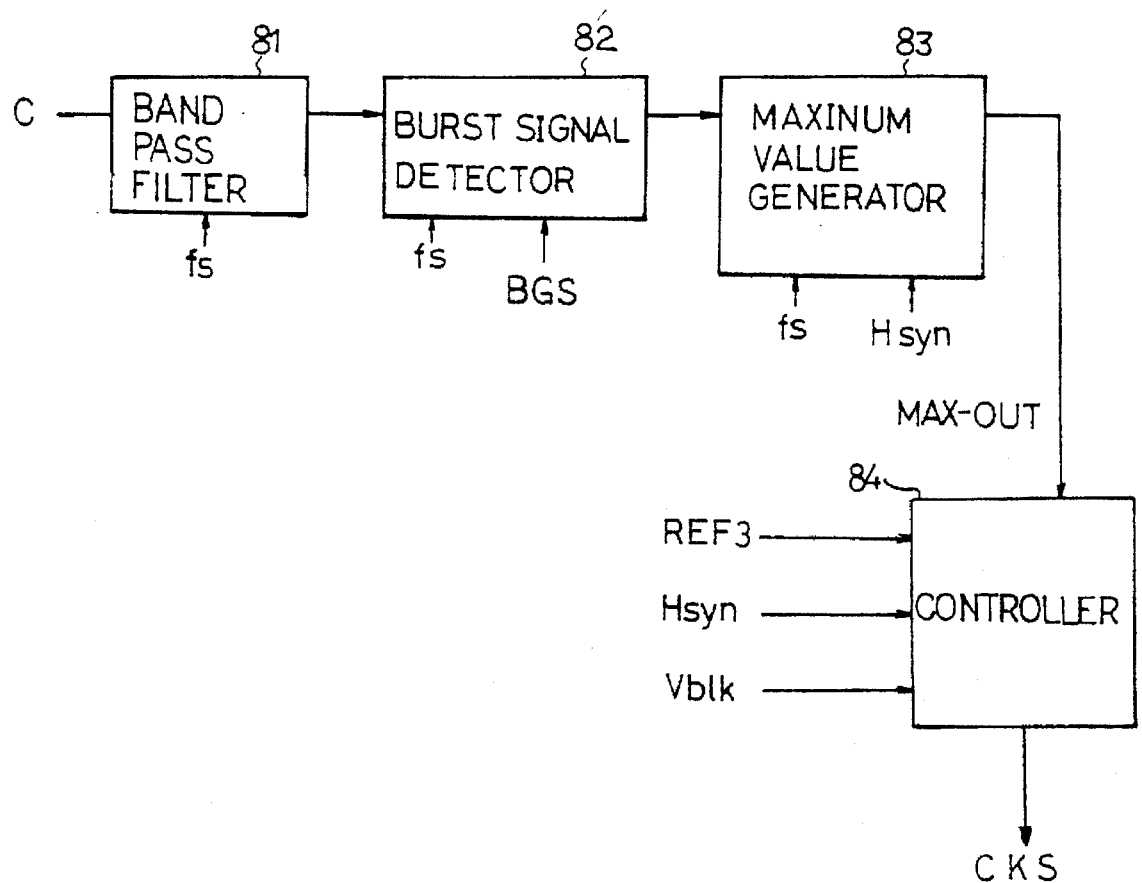

CHROMINANCE SIGNAL PROCESSING APPARATUS FOR DIGITAL TELEVISION RECEIVER

BACKGROUND OF THE INVENTION

1. Field of the Invention

The present invention relates in general to processing a video signal in a television (referred to hereinafter as TV) receiver, and more particularly to a chrominance signal processing apparatus for a digital TV receiver which is capable of processing a chrominance signal using an automatic color control (referred to hereinafter as ACC) circuit and a color killer circuit.

2. Description of the Prior Art

In the National Television System Committee (NTSC) system, generally, a black-and-white TV receiver can produce a black-and-white picture upon receiving a color broadcasting signal, whereas a color TV receiver can produce a color picture when it receives the color broadcasting signal. The color TV receiver may also obtain the black-and-white picture by changing its channel to a black-and-white broadcasting channel.

In detail, in the NTSC system, primary color signals R, G and B of red, green and blue are converted into a luminance signal Y and color difference signals I and Q and then transmitted. Upon receiving the transmitted luminance signal Y and color difference signals I and Q, the black-and-white TV receiver produces the black-and-white picture in response to the received luminance signal Y. When the color TV receiver receives the transmitted luminance signal Y and color difference signals I and Q, it detects the primary color signals R, G and B from the received luminance signal Y and color difference signals I and Q and produces the color picture in response to the detected primary color signals R, G and B.

FIG. 1 is a view illustrating one line of a composite video signal in the NTSC system. As shown in this drawing, a chrominance signal and a color burst signal are applied to a luminance signal. A horizontal synchronous signal has its amplitude of the range from 0 IRE to –40 IRE. The color burst signal (CBS) includes at least 8 cycles of chrominance subcarrier inserted in a back porch of the horizontal synchronous signal. The chrominance signal has its amplitude of the range from 0 IRE to 100 IRE. The color burst signal CBS has a peak to peak value (P—P) of the range from –20 IRE to +20 IRE.

Noticeably, the amplitude of the chrominance signal may be varied due to distortions resulting from a noise and an interference during its transmission, distortions occurring at an antenna and a receiver, a channel change and etc. In order to compensate for such an amplitude variation of the chrominance signal, there has been employed an ACC circuit.

On the other hand, in the case where a black-and-white video signal is received by the color TV receiver, it is imperfectly processed by a luminance/chrominance separation circuit, resulting in the occurrence of cross-color and cross-luminance phenomenons. For this reason, the amplitude of the chrominance signal is checked to discriminate whether the input video signal is black-and-white. If it is discriminated that the input video signal is black-and-white, a color killer circuit is used to block the output of the chrominance signal.

The ACC circuit and the color killer circuit are adapted to determine the amplitude of the chrominance signal on the basis of the amplitude of the color burst signal which has the peak to peak value (P—P) of the range from –20 IRE to +20 IRE. Noticeably, the amplitude of the color burst signal may be increased or reduced due to the distortions during its transmission and at the antenna and receiver. For this reason, the ACC circuit and the color killer circuit serve to control the amplitude of the chrominance signal on the basis of the amplitude of the color burst signal.

Referring to FIG. 2, there is shown a block diagram of a conventional chrominance signal processing apparatus for an analog TV receiver. As shown in this drawing, the conventional chrominance signal processing apparatus comprises a first band pass filter/amplifier circuit 11 for detecting a chrominance signal component of subcarrier frequency band (fs: 3.58 Mhz) from a chrominance signal C from a luminance/chrominance separation circuit (not shown) in the analog TV receiver, a burst gate 12 for detecting a color burst signal CBS from the chrominance signal from the first band pass filter/amplifier circuit 11 in response to an external burst gate signal BGS, an ACC circuit 13 for detecting an amplitude of the color burst signal CBS from the burst gate 12 and comparing the detected amplitude with a reference level, and a color killer circuit 14 for determining in response to an output signal from the ACC circuit 13 whether an input video signal is color or black-and-white and outputting a control signal in accordance with the determined result.

The conventional chrominance signal processing apparatus further comprises a second band pass filter/amplifier circuit 15 responsive to the control signal from the color killer circuit 14 for passing the chrominance signal from the first band pass filter/amplifier circuit 11 if the input video signal is color and blocking it if the input video signal is black-and-white, a chrominance demodulator 16 for detecting color difference signals I and Q from the chrominance signal passed by the second band pass filter/amplifier circuit 15, and a matrix unit 17 for detecting primary color signals R, G and B from the color difference signals I and Q from the chrominance demodulator 16 and a luminance signal Y from the luminance/chrominance separation circuit and outputting the detected primary color signals R, G and B to a monitor.

The operation of the conventional chrominance signal processing apparatus for the analog TV receiver with the above-mentioned construction will hereinafter be described with reference to FIGS. 1 to 3.

First, the composite video signal as shown in FIG. 1 is transmitted to the analog TV receiver. The luminance/chrominance separation circuit in the analog TV receiver separates the chrominance signal C and the luminance signal Y from the transmitted composite video signal. The luminance/chrominance separation circuit then supplies the separated chrominance signal C and luminance signal Y to the first band pass filter/amplifier circuit 11 and the matrix unit 17, respectively. The first band pass filter/amplifier circuit 11 detects the chrominance signal component of subcarrier frequency band (fs: 3.58 Mhz) as shown in FIG. 3 from the chrominance signal C from the luminance/chrominance separation circuit. The first band pass filter/amplifier circuit 11 then amplifies the detected chrominance signal by a predetermined level and applies the amplified chrominance signal to the second band pass filter/amplifier circuit 15 and the burst gate 12.

The burst gate 12 detects the color burst signal CBS from the chrominance signal from the first band pass filter/amplifier circuit 11 in response to the external burst gate signal BGS and outputs the detected color burst signal CBS to the ACC circuit 13. The ACC circuit 13 detects the amplitude of the color burst signal CBS from the burst gate 12 and compares the detected amplitude with the reference level (−20 IRE−+20 IRE). The ACC circuit 13 then outputs a signal as a result of the comparison to the first band pass filter/amplifier circuit 11 and the color killer circuit 14.

At this time, the first band pass filter/amplifier circuit 11 serves to control an amplitude of the chrominance signal in response to the output signal from the ACC circuit 13. Namely, when the amplitude of the color burst signal CBS is lower than the reference level (−20 IRE−+20 IRE), the first band pass filter/amplifier circuit 11 increases the amplitude of the chrominance signal. On the contrary, when the amplitude of the color burst signal CBS is higher than the reference level (−20 IRE−+20 IRE), the first band pass filter/amplifier circuit 11 reduces the amplitude of the chrominance signal.

The color killer circuit 14 serves to control the output of the second band pass filter/amplifier circuit 15 in response to the output signal from the ACC circuit 13. When the amplitude of the color burst signal CBS is lower than the reference level (−20 IRE−+20 IRE), namely, when the input video signal is black-and-white, the color killer circuit 14 controls the second band pass filter/amplifier circuit 15 to block the output of the chrominance signal therefrom.

As a result, when the input video signal is black-and-white, the second band pass filter/amplifier circuit 15 outputs a value of "0" in response to the control signal from the color killer circuit 14. On the contrary, when the input video signal is color, the second band pass filter/amplifier circuit 15 passes the chrominance signal from the first band pass filter/amplifier circuit 11 to the chrominance demodulator 16.

The chrominance demodulator 16 detects the color difference signals I and Q from the chrominance signal passed by the second band pass filter/amplifier circuit 15 and supplies the detected color difference signals I and Q to the matrix unit 17, which also receives the luminance signal Y which is fed from the luminance/chrominance separation circuit and then delayed to match with the color difference signals I and Q from the chrominance demodulator 16. The matrix unit 17 combines the received color difference signals I and Q with the received luminance signal Y and produces the primary color signals R, G and B in accordance with the combined result. The matrix unit 17 then outputs the produced primary color signals R, G and B to the monitor so that a color picture can be displayed on a screen of the monitor.

However, the ACC circuit and the color killer circuit employed in the chrominance signal processing apparatus for the analog TV receiver cannot be applied to a digital TV receiver. Embodying the ACC circuit and the color killer circuit in a digital manner requires the use of many multipliers and read only memories (referred to hereinafter as ROMs), resulting in an increase in the cost and a difficulty in the integration.

SUMMARY OF THE INVENTION

Therefore, the present invention has been made in view of the above problem, and it is an object of the present invention to provide a chrominance signal processing apparatus for a digital TV receiver which is capable of processing a chrominance signal using an ACC circuit and a color killer circuit which have simple constructions with no use of many multipliers and ROMs.

In accordance with the present invention, the above and other objects can be accomplished by a provision of a chrominance signal processing apparatus for a digital television receiver, comprising analog/digital conversion means for converting a transmitted analog composite video signal into a digital signal in response to a clock frequency; luminance/chrominance separation means for separating a luminance signal and a chrominance signal from an output signal from the analog/digital conversion means; delay means for delaying the luminance signal from the luminance/chrominance separation means for a predetermined time period; automatic color control means for controlling an amplitude of the chrominance signal from the luminance/chrominance separation means; chrominance demodulation means for detecting color difference signals from an output signal from the automatic color control means; color killer means for detecting a maximum amplitude value of a color burst signal from the chrominance signal from the luminance/chrominance separation means, comparing the detected maximum amplitude value of the color burst signal with a predetermined reference level and outputting a color killer signal in accordance with the compared result; first multiplexing means for selecting one of the output signal from the analog/digital conversion means and an output signal from the delay means in response to the color killer signal from the color killer means; second multiplexing means for selecting the color difference signals from the chrominance demodulation means or low level signals in response to the color killer signal from the color killer means; digital/analog conversion means for converting output signals from the first and second multiplexing means into analog signals; and matrix means for combining output signals from the digital/analog conversion means to produce primary color signals and outputting the produced primary color signals to a monitor.

BRIEF DESCRIPTION OF THE DRAWINGS

The above and other objects, features and advantages of the present invention will be more clearly understood from the following detailed description taken in conjunction with the accompanying drawings, in which:

FIG. 9 is a detailed circuit diagram of a controller in FIG. 5;

FIG. 11 is a detailed block diagram of a color killer circuit in FIG. 4; and

DETAILED DESCRIPTION OF THE PREFERRED EMBODIMENTS

Figure 4:
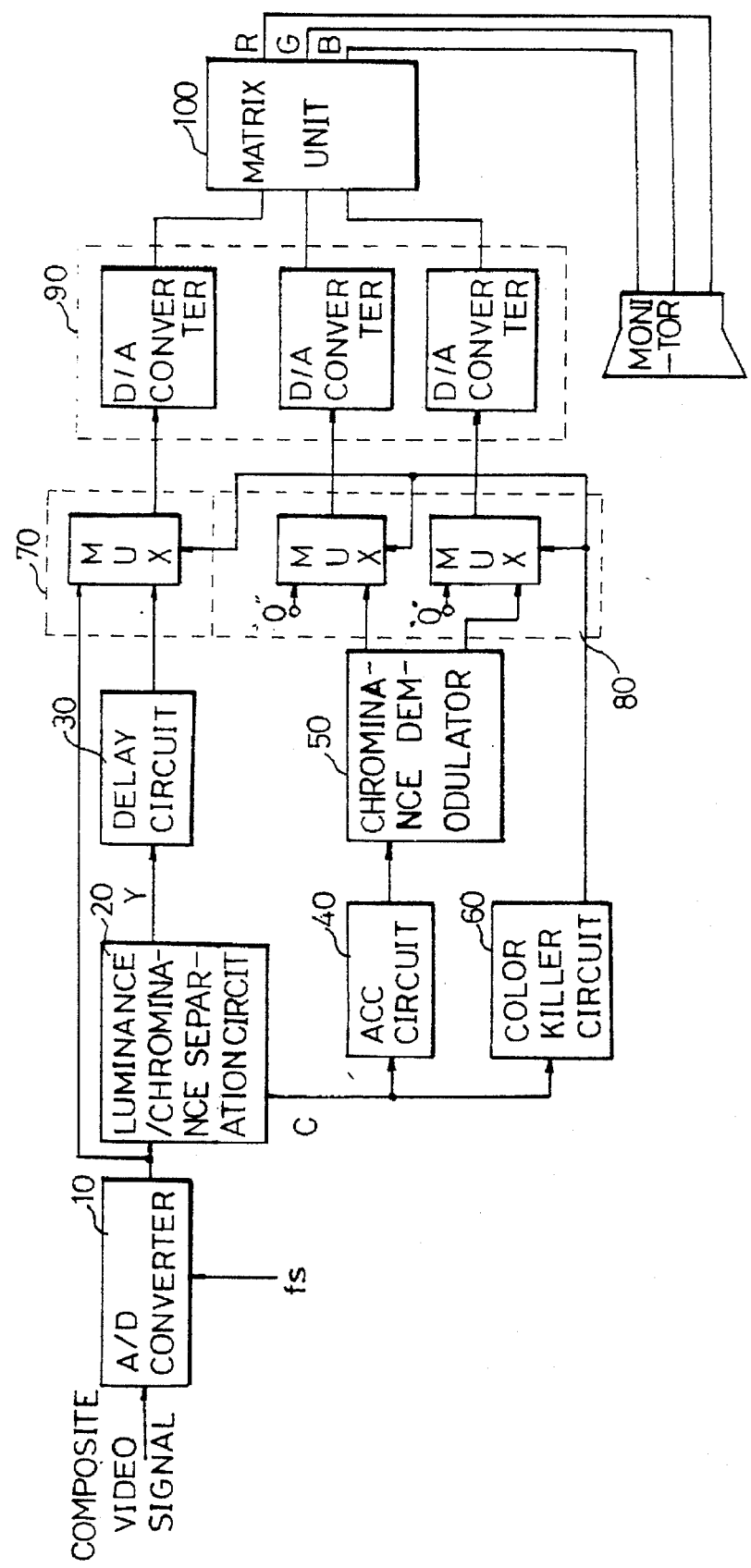
FIG. 4 is a block diagram of a chrominance signal processing apparatus for a digital TV receiver in accordance with the present invention.

Referring to FIG. 4, there is shown a block diagram of a chrominance signal processing apparatus for a digital TV receiver in accordance with the present invention. As shown in this drawing, the chrominance signal processing apparatus comprises an analog/digital (referred to hereinafter as A/D) converter 10 for converting a transmitted analog composite video signal into a digital signal in response to a clock frequency fs, a luminance/chrominance separation circuit 20 for separating a luminance signal Y and a chrominance signal C from an output signal from the A/D converter 10, a delay circuit 30 for delaying the luminance signal Y from the luminance/chrominance separation circuit 20 for a predetermined time period, an ACC circuit 40 for controlling an amplitude of the chrominance signal C from the luminance/chrominance separation circuit 20, a chrominance demodulator 50 for detecting color difference signals I and Q from an output signal from the ACC circuit 40, and a color killer circuit 60 for detecting the amplitude of the chrominance signal C from the luminance/chrominance separation circuit 20, discriminating in response to the detected result whether the input video signal is color or black-and-white and outputting a color killer signal CKS in accordance with the discriminated result.

The chrominance signal processing apparatus further comprises a first multiplexing circuit 70 for selecting one of the output signal from the A/D converter 10 and an output signal from the delay circuit 30 in response to the color killer signal CKS from the color killer circuit 60, a second multiplexing circuit 80 for selecting the color difference signals I and Q from the chrominance demodulator 50 or low level signals in response to the color killer signal CKS from the color killer circuit 60, a digital/analog (referred to hereinafter as D/A) conversion circuit 90 for converting output signals from the first and second multiplexing circuits 70 and 80 into analog signals, and a matrix unit 100 for combining output signals from the D/A conversion circuit 90 to produce primary color signals R, G and B and outputting the produced primary color signals R, G and B to a monitor.

Figure 5:
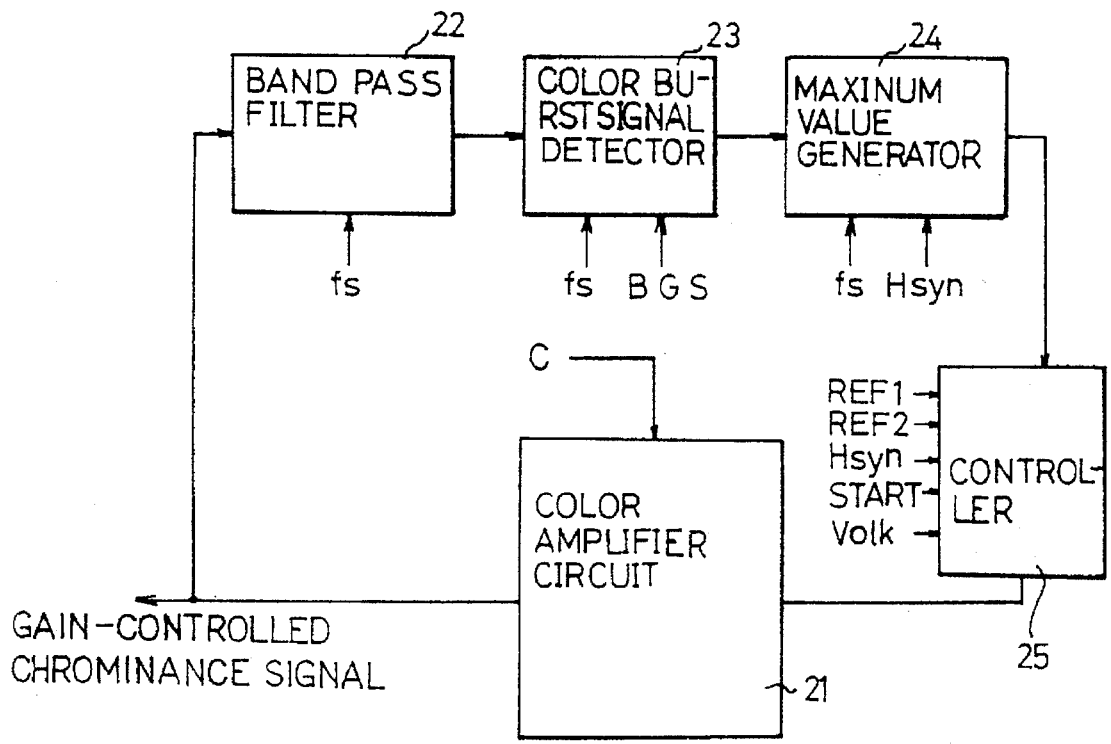
FIG. 5 is a detailed block diagram of an ACC circuit in FIG. 4.

Referring to FIG. 5, there is shown a detailed block diagram of the ACC circuit 40 in FIG. 4. As shown in this drawing, the ACC circuit 40 includes a color amplifier circuit 21 for amplifying the chrominance signal C from the luminance/chrominance separation circuit 20 by a predetermined level, a band pass filter 22 for detecting a chrominance signal component of color subcarrier frequency band fsc from an output signal from the color amplifier circuit 21 in response to the clock frequency fs, and a color burst signal detector 23 for obtaining an absolute value of the chrominance signal from the band pass filter 22 and detecting an absolute value of a color burst signal CBS from the obtained absolute value of the chrominance signal in response to the clock frequency fs and a burst gate signal BGS.

The ACC circuit 40 further includes a maximum value generator 24 for detecting a maximum amplitude value of the color burst signal CBS from the absolute value of the color burst signal CBS from the color burst signal detector 23 in the unit of one line in response to the clock frequency fs and a horizontal synchronous signal Hsyn, and a controller 25 for comparing the maximum amplitude value of the color burst signal CBS from the maximum value generator 24 with first and second reference levels Ref1 and Ref2 and outputting an amplification gain control signal AGC to the color amplifier circuit 21 in accordance with the compared results to vary an amplification gain thereof.

Figure 6:
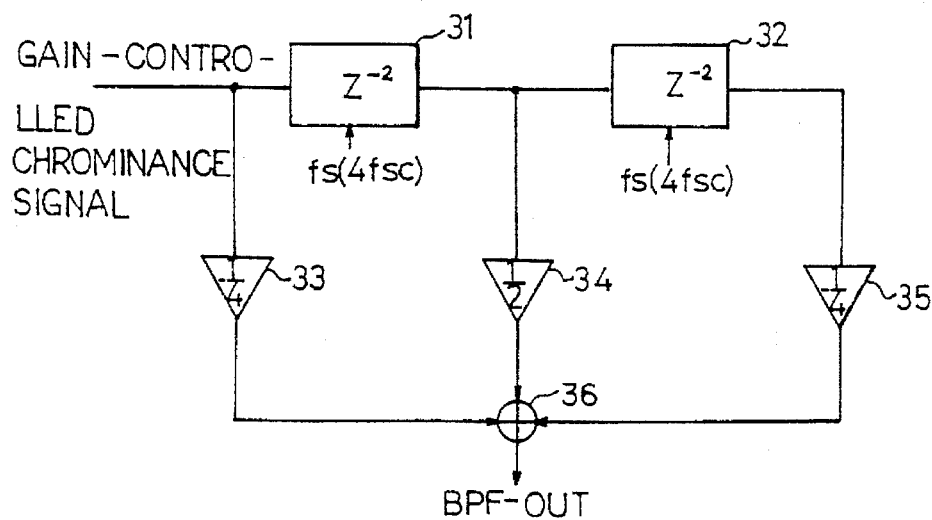
FIG. 6 is a detailed circuit diagram of a band pass filter in FIG. 5.

Referring to FIG. 6, there is shown a detailed circuit diagram of the band pass filter 22 in FIG. 5. As shown in this drawing, the band pass filter 22 includes delay elements 31 and 32 for sequentially delaying the amplified chrominance signal from the color amplifier circuit 21 in response to the clock frequency fs, an amplifier 33 for amplifying the chrominance signal from the color amplifier circuit 21 by −¼, an amplifier 34 for amplifying an output signal from the delay element 31 by ½, an amplifier 35 for amplifying an output signal from the delay element 32 by −¼, and an adder 36 for adding output signals from the amplifiers 33-35 together and outputting the added result as the chrominance signal of color subcarrier frequency band fsc.

Figure 7:
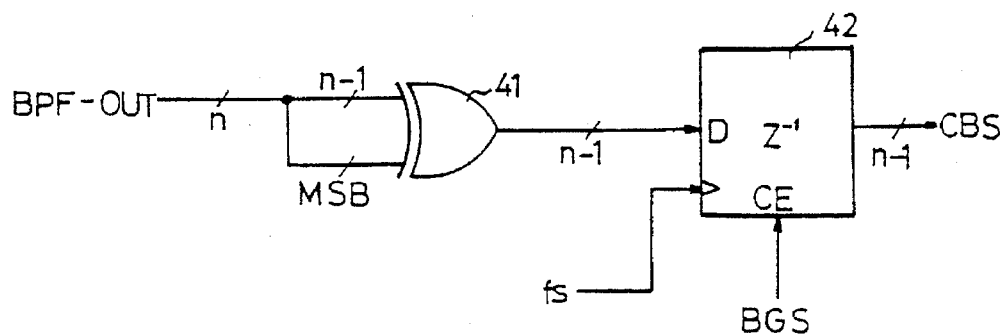
FIG. 7 is a detailed circuit diagram of a color burst signal detector in FIG. 5.

Referring to FIG. 7, there is shown a detailed circuit diagram of the color burst signal detector 23 in FIG. 5. As shown in this drawing, the color burst signal detector 23 includes an exclusive-OR gate 41 for exclusive-ORing a most significant bit MSB of the chrominance signal from the band pass filter 22 and the remaining bits thereof to obtain the absolute value thereof, and a register 42 being enabled in response to the burst gate signal BGS to detect the absolute value of the color burst signal CBS from the absolute value of the chrominance signal from the exclusive-OR gate 41 in response to the clock frequency fs.

Figure 8:
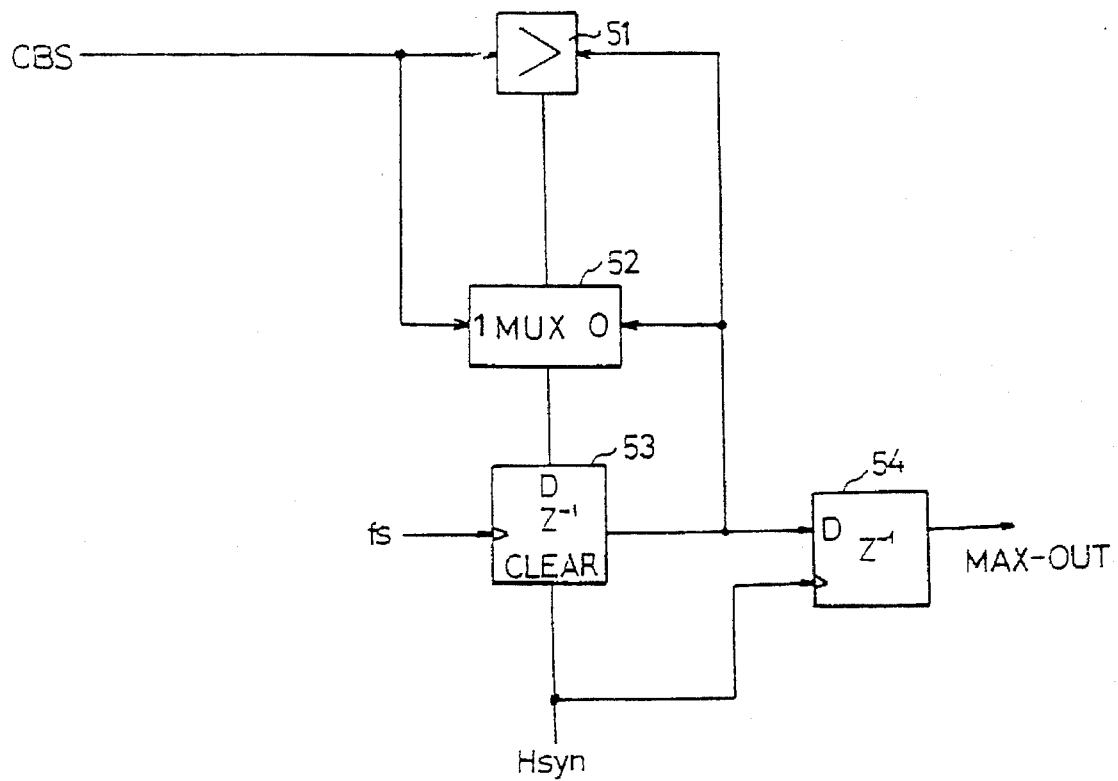
FIG. 8 is a detailed circuit diagram of a maximum value generator in FIG. 5.

Referring to FIG. 8, there is shown a detailed circuit diagram of the maximum value generator 24 in FIG. 5. As shown in this drawing, the maximum value generator 24 includes a comparator 51 for comparing the absolute value of the color burst signal CBS from the color burst signal detector 23 with the previous absolute value of the color burst signal CBS fed back thereto, a multiplexer 52 for selecting the higher one of the absolute value of the color burst signal CBS from the color burst signal detector 23 and the previous absolute value of the color burst signal CBS fed back thereto in response to an output signal from the comparator 51, a register 53 being cleared in response to the horizontal synchronous signal Hsyn and for holding the selected absolute value of the color burst signal CBS from the multiplexer 52 in response to the clock frequency fs and outputting the held absolute value to the comparator 51 and the multiplexer 52, and a register 54 for detecting the maximum amplitude value of the color burst signal CBS from the absolute value of the color burst signal CBS from the register 53 in the unit of one line in response to the horizontal synchronous signal Hsyn.

Referring to FIG. 9, there is shown a detailed circuit diagram of the controller 25 in FIG. 5. As shown in this drawing, the controller 25 includes a comparator 61 for comparing the maximum amplitude value of the color burst signal CBS from the maximum value generator 24 with the first reference level Ref1, a comparator 62 for comparing the maximum amplitude value of the color burst signal CBS from the maximum value generator 24 with the second reference level Ref2, an n-bit up/down counter 63 for performing an up or down counting operation in the unit of one line in response to an output signal from the comparator 62 to output the amplification gain control signal AGC to the color amplifier circuit 21, and a control signal generator 64 for logically combining an output signal from the comparator 61, the output signal from the comparator 62 and the amplification gain control signal AGC from the n-bit up/down counter 63 and outputting the combined result as a control signal to the n-bit up/down counter 63 to control the counting operation thereof.

The control signal generator 64 includes an AND gate AN1 for ANDing the output signals from the comparators 61 and 62, a NOR gate NOR1 for NORing n bits of the amplification gain control signal AGC from the n-bit up/down counter 63, an AND gate AN2 for ANDing the n bits of the amplification gain control signal AGC from the n-bit up/down counter 63, an inverter IN1 for inverting the output signal from the comparator 62, an AND gate AN3 for ANDing an output signal from the inverter IN1 and an output signal from the NOR gate NOR1, an AND gate AN4 for ANDing an output signal from the AND gate AN2 and the output signal from the comparator 62, and a NOR gate NOR2 for NORing output signals from the AND gates AN1, AN3 and AN4 and a vertical blanking signal Vblk and outputting the NORed result as the control signal to an enable terminal CE of the n-bit up/down counter 63.

Figure 10:
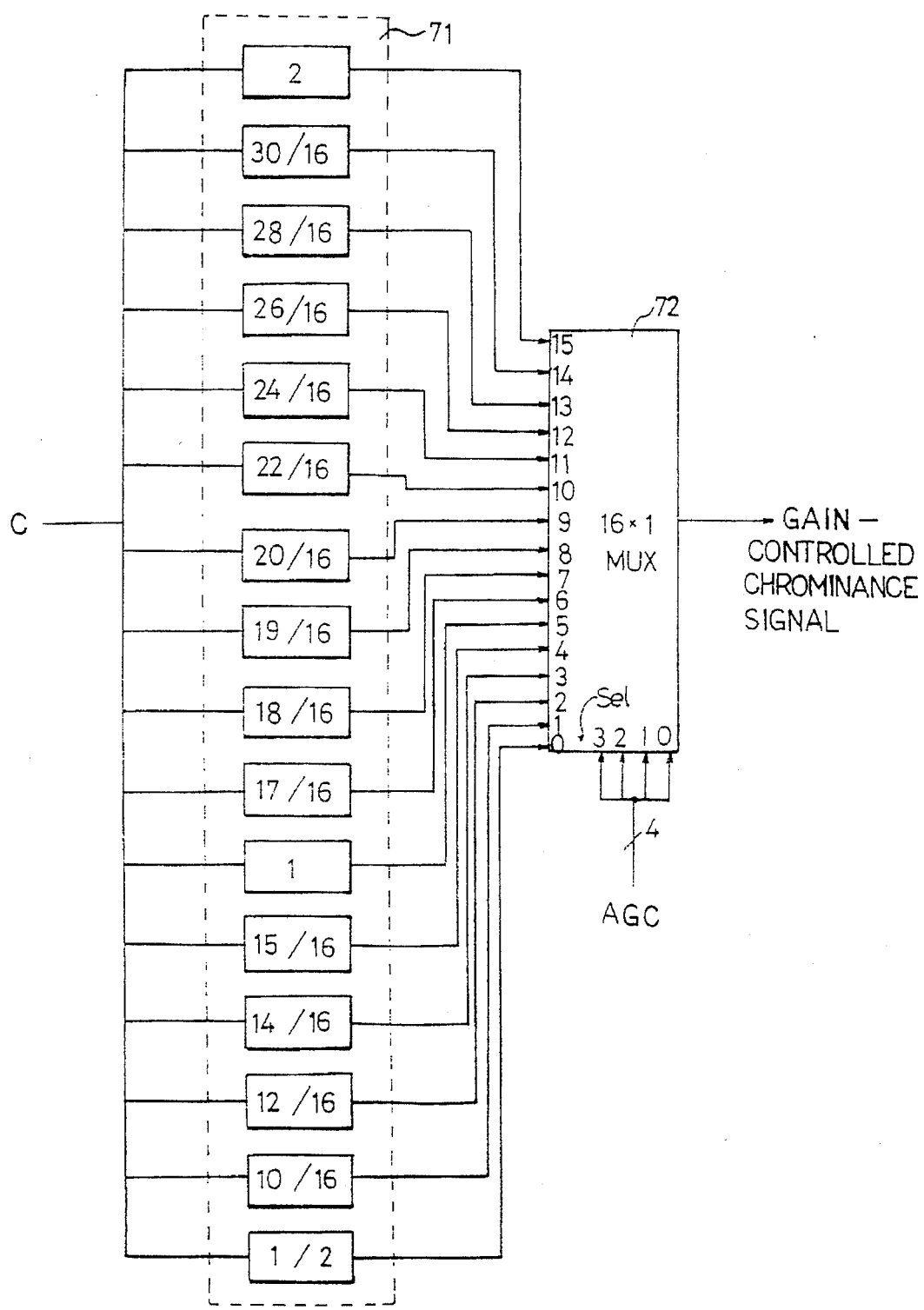
FIG. 10 is a detailed circuit diagram of a color amplifier circuit in FIG. 5.

Referring to FIG. 10, there is shown a detailed circuit diagram of the color amplifier circuit 21 in FIG. 5. As shown in this drawing, the color amplifier circuit 21 includes an amplifier 71 for amplifying the chrominance signal C from the luminance/chrominance separation circuit 20 by amplification levels of 16 stages, and a multiplexer 72 for selecting one of 16 output signals from the amplifier 71 in response to the amplification gain control signal AGC from the controller 25.

Referring to FIG. 11, there is shown a detailed block diagram of the color killer circuit 60 in FIG. 4. As shown in this drawing, the color killer circuit 60 includes a band pass filter 81 for detecting the chrominance signal component of color subcarrier frequency band fsc from the chrominance signal C from the luminance/chrominance separation circuit 20 in response to the clock frequency fs, and a color burst signal detector 82 for obtaining the absolute value of the chrominance signal from the band pass filter 81 and detecting the absolute value of the color burst signal CBS from the obtained absolute value of the chrominance signal in response to the clock frequency fs and the burst gate signal BGS.

The color killer circuit 60 further includes a maximum value generator 83 for detecting the maximum amplitude value of the color burst signal CBS from the absolute value of the color burst signal CBS from the color burst signal detector 82 in the unit of one line in response to the clock frequency fs and the horizontal synchronous signal Hsyn, and a controller 84 for comparing the maximum amplitude value of the color burst signal CBS from the maximum value generator 83 with a reference level Ref3 and outputting the color killer signal CKS to the first and second multiplexing circuits 70 and 80 in accordance with the compared result and in response to the horizontal synchronous signal Hsyn and the vertical blanking signal Vblk.

Figure 12:
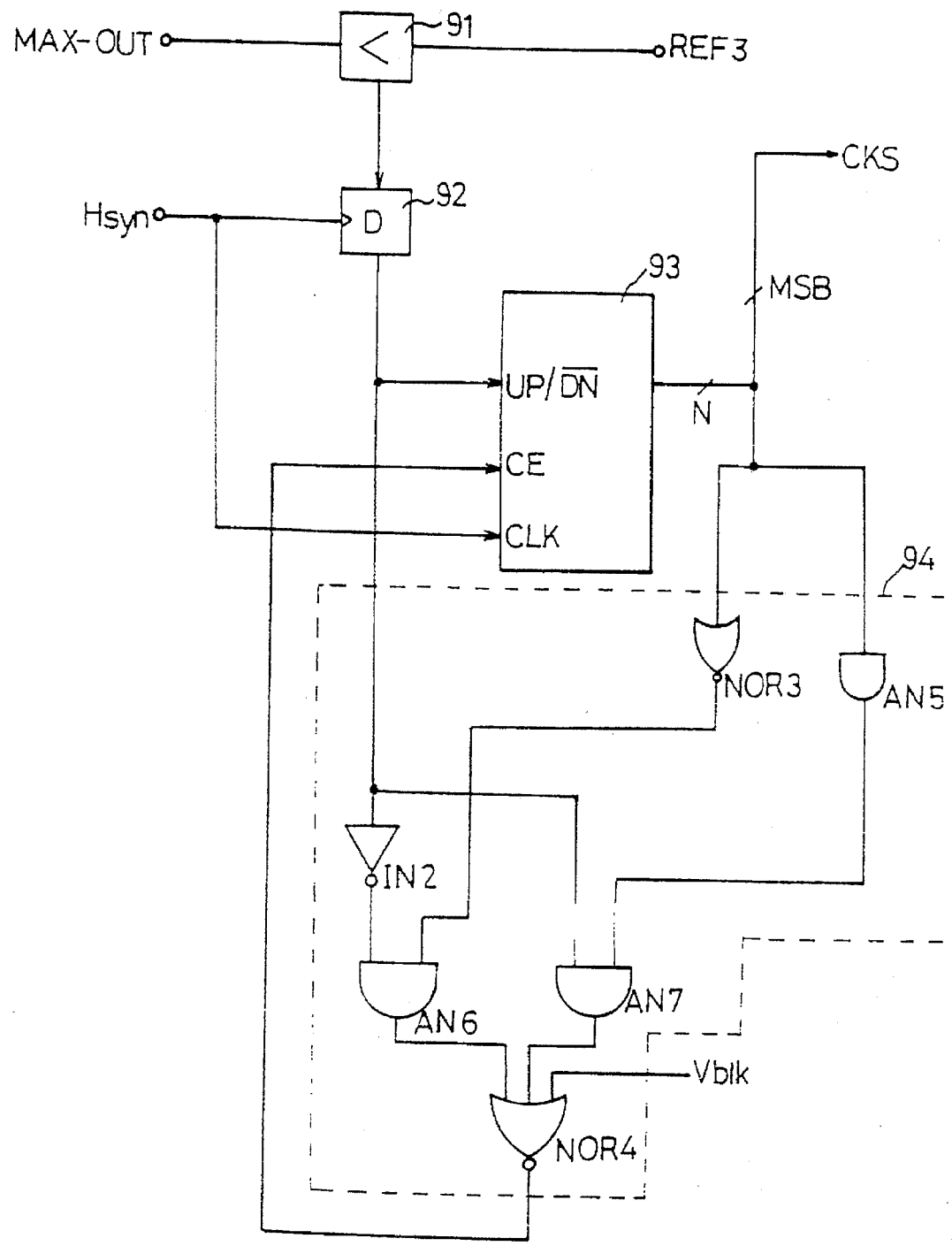
FIG. 12 is a detailed circuit diagram of a controller in FIG. 11.

Referring to FIG. 12, there is shown a detailed circuit diagram of the controller 84 in FIG. 11. As shown in this drawing, the controller 84 includes a comparator 91 for comparing the maximum amplitude value of the color burst signal CBS from the maximum value generator 83 with the reference level Ref3, a D flip-flop 92 for receiving the horizontal synchronous signal Hsyn at its clock terminal and holding an output signal from the comparator 91 at a rising edge of the received horizontal synchronous signal Hsyn, an n-bit up/down counter 93 for performing an up or down counting operation in response to an output signal from the D flip-flop 92 to output the color killer signal CKS to the first and second multiplexing circuits 70 and 80, and a control signal generator 94 for logically combining the output signal from the D flip-flop 92 and the color killer signal CKS from the n-bit up/down counter 93 and outputting the combined result as a control signal to the n-bit up/down counter 93 to control the counting operation thereof.

The control signal generator 94 includes a NOR gate NOR3 for NORing n bits of an output signal from the n-bit up/down counter 93, an AND gate AN5 for ANDing the n bits of the output signal from the n-bit up/down counter 93, an inverter IN2 for inverting the output signal from the D flip-flop 92, an AND gate AN6 for ANDing an output signal from the inverter IN2 and an output signal from the NOR gate NOR3, an AND gate AN7 for ANDing an output signal from the AND gate AN5 and the output signal from the D flip-flop 92, and a NOR gate NOR4 for NORing output signals from the AND gates AN6 and AN7 and the vertical blanking signal Vblk and outputting the NORed result as the control signal to an enable terminal CE of the n-bit up/down counter 93.

The operation of the chrominance signal processing apparatus for the digital TV receiver with the above-mentioned construction in accordance with the present invention will hereinafter be described in detail with reference to FIGS. 4 to 12.

First, upon receiving the analog composite video signal, the A/D converter 10 converts it into the digital signal in response to the clock frequency fs and outputs the digital signal to the luminance/chrominance separation circuit 20, which separates the luminance signal Y and the chrominance signal C therefrom. The luminance/chrominance separation circuit 20 then supplies the separated luminance signal Y to the delay circuit 30. The luminance/chrominance separation circuit 20 also supplies the separated chrominance signal C to the ACC circuit 40 and the color killer circuit 60.

The delay circuit 30 delays the luminance signal Y from the luminance/chrominance separation circuit 20 for the predetermined time period and outputs the delayed luminance signal Y to one input terminal of the first multiplexing circuit 70, which also receives the composite video signal from the A/D converter 10 at its other input terminal.

The ACC circuit 40 detects the maximum amplitude value of the color burst signal CBS from the chrominance signal C from the luminance/chrominance separation circuit 20 in the unit of one line. The ACC circuit 40 then compares the detected maximum amplitude value of the color burst signal CBS with the first and second reference levels Ref1 and Ref2 and controls a gain of the chrominance signal in accordance with the compared results. The chrominance demodulator 50 demodulates the gain-controlled chrominance signal from the ACC circuit 40 into the color difference signals I and Q (or u and V) which are then supplied to the second multiplexing circuit 80.

The color killer circuit 60 detects the maximum amplitude value of the color burst signal CBS from the chrominance signal C from the luminance/chrominance separation circuit 20 in the unit of one line. The color killer circuit 60 then compares the detected maximum amplitude value of the color burst signal CBS with the third reference level Ref3 and applies the color killer signal CBS to control terminals of the first and second multiplexing circuits 70 and 80 in accordance with the compared result. When the detected maximum amplitude value of the color burst signal CBS is lower than the third reference level Ref3, the color killer circuit 60 generates the color killer signal CKS of high level. On the contrary, if the detected maximum amplitude value of the color burst signal CBS is higher than the third reference level Ref3, the color killer circuit 60 generates the color killer signal CKS of low level.

If the color killer signal CKS from the color killer circuit 60 is high in level, the first multiplexing circuit 70 transfers the composite video signal from the A/D converter 10 to the D/A conversion circuit 90 and the second multiplexing circuit 80 outputs a value of "0" or low level to the D/A conversion circuit 90. The D/A conversion circuit 90 converts the output signals from the first and second multiplexing circuits 70 and 80 into analog signals. The matrix unit 100 combines the analog signals from the D/A conversion circuit 90. The matrix unit 100 then outputs the combined signal to the monitor. In this case, the combined signal does not contain the primary color signals R, G and B. As a result, a black-and-white picture is displayed on a screen of the monitor.

On the other hand, when the color killer signal CKS from the color killer circuit 60 is low in level, the first multiplexing circuit 70 transfers the delayed luminance signal Y from the delay circuit 30 to the D/A conversion circuit 90 and the second multiplexing circuit 80 transfers the color difference signals I and Q from the chrominance demodulator 50 to the D/A conversion circuit 90. The D/A conversion circuit 90 converts the output signals from the first and second multiplexing circuits 70 and 80 into analog signals. The matrix unit 100 combines the analog signals from the D/A conversion circuit 90 to produce the primary color signals R, G and B. The matrix unit 100 then outputs the produced primary color signals R, G and B to the monitor. As a result, a color picture is displayed on the screen of the monitor.

The operations of the ACC circuit 40 and color killer circuit 60 will hereinafter be described in more detail.

As shown in FIG. 5, in the ACC circuit 40, the chrominance signal C from the luminance/chrominance separation circuit 20 is transferred through the color amplifier circuit 21 to the band pass filter 22, a center frequency of which is the color subcarrier frequency fsc of about 3.58 MHz. The band pass filter 22 detects the chrominance signal component of color subcarrier frequency band fsc from the output signal from the color amplifier circuit 21 in response to the clock frequency fs. The color burst signal detector 23 obtains the absolute value of the chrominance signal from the band pass filter 22. The color burst signal detector 23 then detects the absolute value of the color burst signal CBS from the obtained absolute value of the chrominance signal in response to the clock frequency fs and the burst gate signal BGS.

The maximum value generator 24 detects the maximum amplitude value of the color burst signal CBS from the absolute value of the color burst signal CBS from the color burst signal detector 23 in the unit of one line in response to the clock frequency fs and the horizontal synchronous signal Hsyn. The controller 25 compares the maximum amplitude value of the color burst signal CBS from the maximum value generator 24 with the first and second reference levels Ref1 and Ref2. The controller 25 then outputs the amplification gain control signal AGC to the color amplifier circuit 21 in accordance with the compared results to control the amplification gain thereof. When the maximum amplitude value of the color burst signal CBS from the maximum value generator 24 is lower than the reference level of 20 IRE, the controller 25 outputs the amplification gain control signal AGC to the color amplifier circuit 21 so that the chrominance signal C can be amplified. On the contrary, if the maximum amplitude value of the color burst signal CBS from the maximum value generator 24 is higher than the reference level of 20 IRE, the controller 25 outputs the amplification gain control signal AGC to the color amplifier circuit 21 so that the chrominance signal C can be attenuated. The color amplifier circuit 21 then supplies the gain-controlled chrominance signal to the chrominance demodulator 50.

Namely, the ACC circuit 40 can maintain the gain of the chrominance signal constant on the basis of the automatic color control loop in FIG. 5. The band pass filter 22 has a frequency amplitude characteristic as follows:

$$H[x]=\tfrac{1}{2}(1-COS2\pi fs)$$

As a result, in the case where the clock frequency fs is four times as high as the color subcarrier frequency fsc, namely, 14.3 MHz, the band pass filter 22 can extract the chrominance signal component of color subcarrier frequency band fsc from the received chrominance signal C.

In the band pass filter 22, as shown in FIG. 6, the delay elements 31 and 32 sequentially delay the chrominance signal from the color amplifier circuit 21 in response to the clock frequency fs of 14.3 MHz. The amplifier 33 amplifies the chrominance signal from the color amplifier circuit 21 by $-\tfrac{1}{4}$. The amplifier 34 amplifies the output signal from the delay element 31 by $\tfrac{1}{2}$. The amplifier 35 amplifies the output signal from the delay element 32 by $-\tfrac{1}{4}$. The adder 36 adds the output signals from the amplifiers 33–35 together. As a result of the addition, the adder 36 extracts the chrominance signal component of color subcarrier frequency band fsc as shown in FIG. 3.

Figure 1:
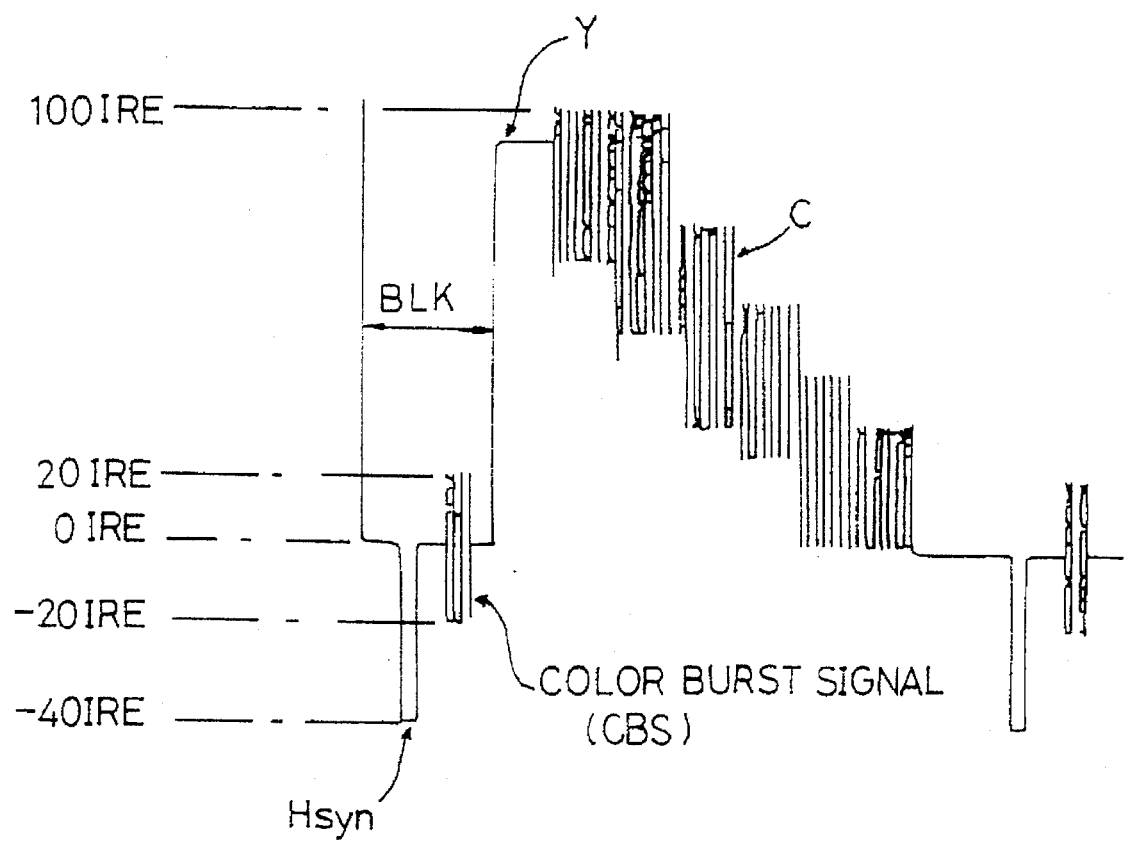
FIG. 1 is a view illustrating one line of a composite video signal in an NTSC system.
Figure 2:
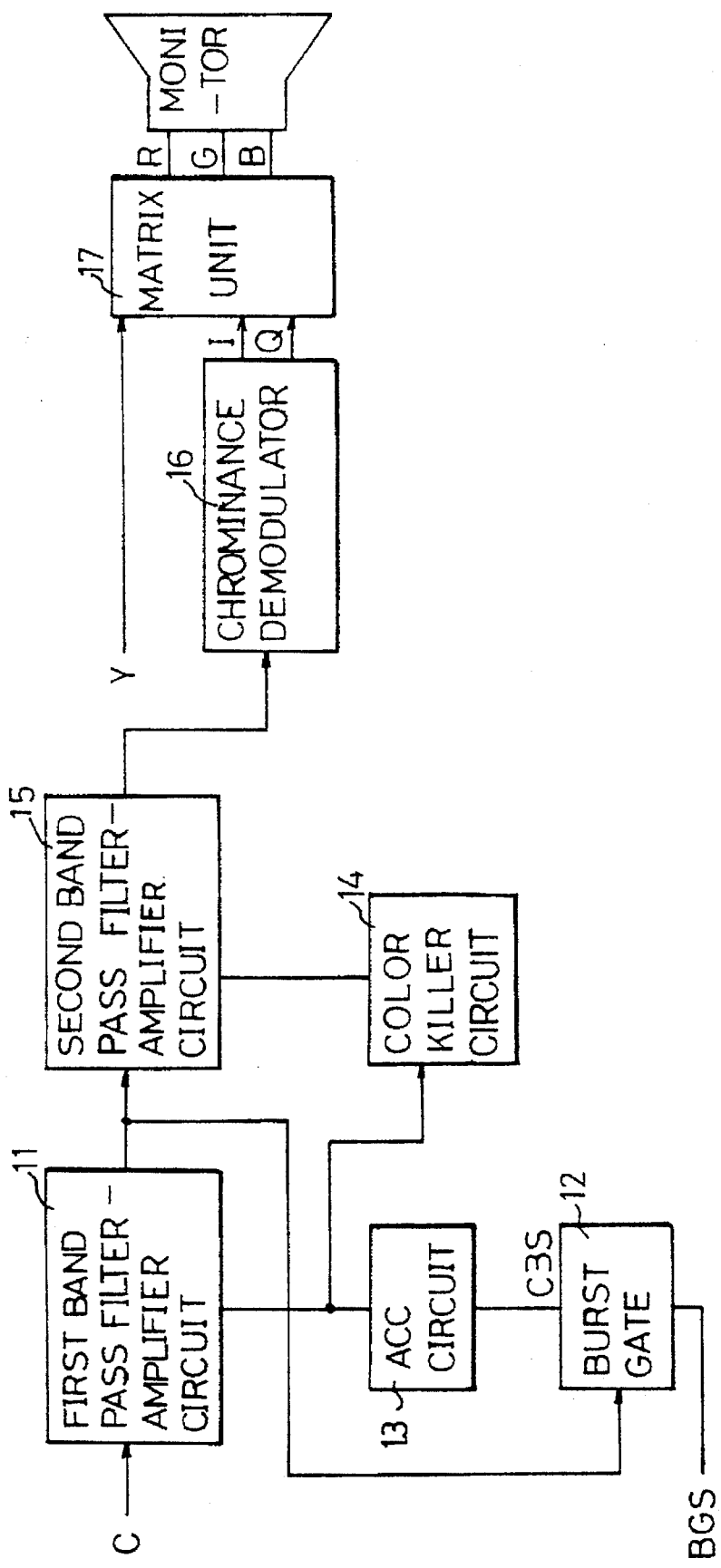
FIG. 2 is a block diagram of a conventional chrominance signal processing apparatus for an analog TV receiver.
Figure 3:
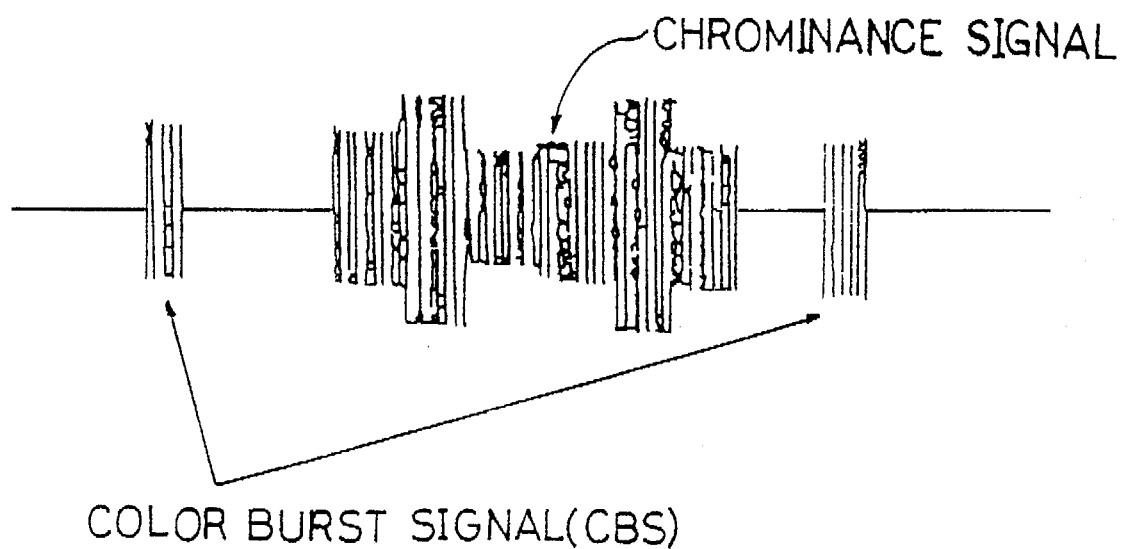
FIG. 3 is a view illustrating a signal filtered at a subcarrier band (fs: 3.58 Mhz) by a band pass filter/amplifier circuit in FIG. 2.

In the color burst signal detector 23, as shown in FIG. 7, the exclusive-OR gate 41 receives n bits of the chrominance signal of color subcarrier frequency band fsc as shown in FIG. 3 which is supplied from the band pass filter 22. The exclusive-OR gate 41 then exclusive-ORes the most significant bit MSB of the received chrominance signal and the remaining bits thereof to obtain the absolute value thereof which is n−1 bits. The register 42 is enabled in response to the burst gate signal BGS which is high in level in an interval that the color burst signal CBS is present. As being enabled, the register 42 detects the absolute value of the color burst signal CBS from the (n−1)-bit absolute value of the chrominance signal from the exclusive-OR gate 41 in response to the clock frequency fs.

In the maximum value generator 24, as shown in FIG. 8, the comparator 51 compares the absolute value of the color burst signal CBS from the color burst signal detector 23 with the previous absolute value of the color burst signal CBS from the register 53 fed back thereto. If the absolute value of the color burst signal CBS from the color burst signal detector 23 is higher than the previous absolute value of the color burst signal CBS from the register 53, the comparator 51 outputs a high level signal to the multiplexer 52. On the contrary, if the absolute value of the color burst signal CBS from the color burst signal detector 23 is lower than the previous absolute value of the color burst signal CBS from the register 53, the comparator 51 outputs a low level signal to the multiplexer 52.

When the output signal from the comparator 51 is high in level, the multiplexer 52 transfers the absolute value of the color burst signal CBS from the color burst signal detector 23 to the register 53. On the contrary, if the output signal from the comparator 51 is low in level, the multiplexer 52 transfers the previous absolute value of the color burst signal CBS to the register 53.

The register 53 is cleared in response to the horizontal synchronous signal Hsyn. As being cleared, the register 53 feeds the selected absolute value of the color burst signal CBS from the multiplexer 52 back to the comparator 51 and the multiplexer 52 in response to the clock frequency fs. The register 53 also outputs the selected absolute value of the color burst signal CBS from the multiplexer 52 to the register 54. The register 54 detects the maximum amplitude value of the color burst signal CBS from the absolute value of the color burst signal CBS from the register 53 in the unit of one line in response to the horizontal synchronous signal Hsyn. The register 54 then supplies the detected maximum amplitude value of the color burst signal CBS to the controller 24.

As shown in FIG. 9, in the controller 24, the comparators 61 and 62 compare the maximum amplitude value of the color burst signal CBS from the maximum value generator 24 with the first and second reference levels Ref1 and Ref2, respectively. The first and second reference levels Ref1 and Ref2 are determined according to a selected amplification stage of the color amplifier circuit 21. For example, in the case where the color burst signal CBS has its peak-to-peak value (P—P) of 40 IRE, the first reference level Ref1 may be set to about 19 IRE and the second reference level Ref2 may be set to about 21 IRE.

When the maximum amplitude value of the color burst signal CBS from the maximum value generator 24 is higher than the first reference level Ref1 of 19 IRE, the comparator 61 outputs a high level signal to the control signal generator 64. On the contrary, if the maximum amplitude value of the color burst signal CBS from the maximum value generator 24 is lower than the first reference level Ref1 of 19 IRE, the comparator 61 outputs a low level signal to the control signal generator 64. On the other hand, if the second reference level Ref2 of 21 IRE is higher than the maximum amplitude value of the color burst signal CBS from the maximum value generator 24, the comparator 62 outputs a high level signal to the n-bit up/down counter 63 and the control signal generator 64. On the contrary, if the second reference level Ref2 of 21 IRE is lower than the maximum amplitude value of the color burst signal CBS from the maximum value generator 24, the comparator 62 outputs a low level signal to the n-bit up/down counter 63 and the control signal generator 64.

In the case where a start signal START is high in level, the n-bit up/down counter 63 outputs the amplification gain control signal AGC to the color amplifier circuit 21 so that the amplification level thereof can become 1. Then, while the n-bit up/down counter 63 receives a high level signal from the control signal generator 64 at its enable terminal CE, it performs the counting operation in the unit of one line whenever the horizontal synchronous signal Hsyn is high in level. At this time, the n-bit up/down counter 63 performs the up-counting operation when the output signal from the comparator 62 is high in level, whereas it performs the down-counting operation when the output signal from the comparator 62 is low in level.

In the control signal generator 64, the AND gate AN1 outputs a high level signal when the amplitude of the color burst signal is normal, namely, Ref1<maximum amplitude<Ref2. Also, the vertical blanking signal Vblk goes high in level when the color burst signal CBS is not present. When the output signal from the AND gate AN1 is high in level or the vertical blanking signal Vblk is high in level, the NOR gate NOR2 outputs a low level signal to the enable terminal CE of the n-bit up/down counter 63 to stop the counting operation thereof. As a result, the n-bit up/down counter 63 holds its previous output value.

When the n-bit up/down counter 63 is to perform the up-counting operation again in response to the high level signal from the comparator 62 under the condition that it has counted to its maximum value (for example, 1111 in case of 4 bits), the output signal from the AND gate AN4 goes high in level. Also, when the n-bit up/down counter 63 is to perform the down-counting operation again in response to the low level signal from the comparator 62 under the condition that it has counted down to its minimum value (for example, 0000 in case of 4 bits), the output signal from the AND gate AN3 goes high in level. If the output signal from the AND gate AN3 or AN4 is high in level, the NOR gate NOR2 outputs a low level signal to the enable terminal CE of the n-bit up/down counter 63 to stop the counting operation thereof. As a result, the n-bit up/down counter 63 holds its previous output value.

Noticeably, the number of count bits of the n-bit up/down counter 63 is determined according to the number of amplification stages of the color amplifier circuit 21. For example, if the number of amplification stages of the color amplifier circuit 21 is 16, the number of count bits of the n-bit up/down counter 63 is 4.

In the color amplifier circuit 21, as shown in FIG. 10, the amplifier 71 amplifies the chrominance signal C from the luminance/chrominance separation circuit 20 by amplification levels of 16 stages from ½ to 2. The amplifier 71 then outputs the amplified signals to input terminals 0–15 of the multiplexer 72, respectively. The multiplexer 72 also receives the amplification gain control signal AGC from the n-bit up/down counter 63 in the controller 25 at its select terminal Sel. The multiplexer 72 then selects one of the 16 output signals from the amplifier 71 in response to the amplification gain control signal AGC from the controller 25. In result, the multiplexer 72 supplies the gain-controlled chrominance signal to the chrominance demodulator 50.

Preferably, the amplification stages of the amplifier 71 employ combination of ½, ¼, ⅛, and 1/16. Therefore, the amplifier 71 can be implemented by a bit shift process with no use of multipliers.

In the color killer circuit 60, as shown in FIG. 11, the band pass filter 81, the color burst signal detector 82 and the maximum value generator 83 are operated in the same manner as those in the ACC circuit 40. As a result, the maximum value generator 83 detects the maximum amplitude value of the color burst signal CBS from the absolute value of the color burst signal CBS from the color burst signal detector 82 in the unit of one line and supplies the detected maximum amplitude value of the color burst signal CBS to the controller 84.

In the controller 84, as shown in FIG. 12, the comparator 91 compares the maximum amplitude value of the color burst signal CBS from the maximum value generator 83 with the reference level Ref3. If the maximum amplitude value of the color burst signal CBS from the maximum value generator 83 is lower than the reference level Ref3, the comparator 91 outputs a high level signal to the D flip-flop 92. On the contrary, when the maximum amplitude value of the color burst signal CBS from the maximum value generator 83 is higher than the reference level Ref3, the comparator 91 outputs a low level signal to the D flip-flop 92. The D flip-flop 92 delays the output signal from the comparator 91 by one line in response to the horizontal synchronous signal Hsyn being received at its clock terminal. The D flip-flop 92 then applies the delayed signal to an up/down terminal UP/DN of the n-bit up/down counter 93.

Generally, the presence of a color signal in the TV can be discriminated on the basis of 1/10 the amplitude (−20 IRE–+20 IRE) of the color burst signal CBS. In this connection, the reference level Ref3 is about 2 IRE.

The control signal generator 94 NORes the output signal from the D flip-flip 92, the color killer signal CKS from the n-bit up/down counter 93 and the vertical blanking signal Vblk and outputs the NORed result as the control signal to the enable terminal CE of the n-bit up/down counter 93. While the n-bit up/down counter 93 receives a high level signal from the control signal generator 94 at its enable terminal CE, it performs the counting operation whenever the horizontal synchronous signal Hsyn is high in level. At this time, the n-bit up/down counter 93 performs the up or down-counting operation in response to the output signal from the D flip-flop 92. While performing the up or down-counting operation, the n-bit up/down counter 93 provides an n-bit output signal, a most significant bit MSB of which is the color killer signal CKS.

The vertical blanking signal Vblk goes high in level when the color burst signal CBS is not present. When the n-bit up/down counter 93 is to perform the up-counting operation again in response to the high level signal from the D flip-flop 92 under the condition that it has counted up to its maximum bit value (in this case n bits are all 1), the output signal from the AND gate AN6 goes high in level. Also, when the n-bit up/down counter 93 is to perform the down-counting operation again in response to the low level signal from the D flip-flop 92 under the condition that it has counted down to its minimum bit value (in this case n bits are all 0), the output signal from the AND gate AN7 goes high in level. If the vertical blanking signal Vblk is high in level or the output signal from the AND gate AN6 or AN7 is high in level, the NOR gate NOR4 outputs a low level signal to the enable terminal CE of the n-bit up/down counter 93 to stop the counting operation thereof. As a result, the n-bit up/down counter 93 holds its previous output value.

Preferably, the n-bit up/down counter 93 has a capacity of at least 9 bits suitable for a stable operation of the color killer circuit 60. In the case where the n-bit up/down counter 93 has a 9-bit capacity, it outputs the color killer signal CKS of high level when the lines of the maximum amplitude value of the color burst signal CBS lower than the reference level Ref3 are larger in number by at least 256 than those higher than the reference level Ref3, namely when the input video signal is black-and-white.

If the color killer signal CKS from the color killer circuit 60 is high in level, the first multiplexing circuit 70 transfers the composite video signal from the A/D converter 10 to the D/A conversion circuit 90 and the second multiplexing circuit 80 outputs a value of "0" or low level to the D/A conversion circuit 90. As a result, a black-and-white picture is displayed on the screen of the monitor.

In other words, when the composite video signal is black-and-white, the color killer circuit 60 blocks the transfer of the color difference signals I and Q to the monitor so that only the black-and-white video signal can be transferred to the monitor. In the case where the composite video signal is color, the ACC circuit 40 properly compensates for the level of the chrominance signal by means of amplification so that a definite color picture can be displayed on the screen of the monitor.

As apparent from the above description, the present invention embodies, with no use of costly multipliers and ROMs, the ACC circuit for compensating for an amplitude variation of the chrominance signal and the color killer circuit for blocking the output of the chrominance signal when the composite video signal is black-and-white. Therefore, the present invention can effectively be applied to the digital TV. Also, the present invention has the effect of reducing the manufacturing cost and making the integration easy.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A chrominance signal processing apparatus for a digital television receiver, comprising:

analog/digital conversion means for converting a transmitted analog composite video signal into a digital signal in response to a clock frequency;

luminance/chrominance separation means for separating a luminance signal and a chrominance signal from an output signal from said analog/digital conversion means;

delay means for delaying the luminance signal from said luminance/chrominance separation means for a predetermined time period;

automatic color control means for controlling an amplitude of the chrominance signal from said luminance/chrominance separation means;

chrominance demodulation means for detecting color difference signals from an output signal from said automatic color control means;

color killer means for detecting a maximum amplitude value of a color burst signal from the chrominance signal from said luminance/chrominance separation means, comparing the detected maximum amplitude value of the color burst signal with a predetermined reference level and outputting a color killer signal in accordance with the compared result;

first multiplexing means for selecting one of the output signal from said analog/digital conversion means and an output signal from said delay means in response to the color killer signal from said color killer means;

second multiplexing means for selecting the color difference signals from said chrominance demodulation means or low level signals in response to the color killer signal from said color killer means;

digital/analog conversion means for converting output signals from said first and second multiplexing means into analog signals; and matrix means for combining output signals from said digital/analog conversion means to produce primary color signals and outputting the produced primary color signals to a monitor.

2. A chrominance signal processing apparatus for a digital television receiver, as set forth in claim 1, wherein said second multiplexing means selects the low level signals to block the output of the color difference signals from said chrominance demodulation means, when the color killer signal from said color killer means is high in level.

3. A chrominance signal processing apparatus for a digital television receiver, as set forth in claim 1, wherein said automatic color control means includes:

a color amplifier circuit for amplifying the chrominance signal from said luminance/chrominance separation means by a predetermined level;

a band pass filter for detecting a chrominance signal component of color subcarrier frequency band from the amplified chrominance signal from said color amplifier circuit in response to the clock frequency;

a color burst signal detector for obtaining an absolute value of the chrominance signal from said band pass filter and detecting an absolute value of the color burst signal from the obtained absolute value of the chrominance signal in response to the clock frequency and a burst gate signal;

a maximum value generator for detecting the maximum amplitude value of the color burst signal from the absolute value of the color burst signal from said color burst signal detector in the unit of one line in response to the clock frequency and a horizontal synchronous signal; and a controller for comparing the maximum amplitude value of the color burst signal from said maximum value generator with first and second reference levels and outputting an amplification gain control signal to said color amplifier circuit in accordance with the compared results to vary an amplification gain thereof.

4. A chrominance signal processing apparatus for a digital television receiver, as set forth in claim 3, wherein said band pass filter includes:

first and second delay elements for sequentially delaying the chrominance signal from said color amplifier circuit in response to the clock frequency;

a first amplifier for amplifying the chrominance signal from said color amplifier circuit by −¼;

a second amplifier for amplifying an output signal from said first delay element by ½;

a third amplifier for amplifying an output signal from said second delay element by −¼; and an adder for adding output signals from said first to third amplifiers together and outputting the added result as the chrominance signal of color subcarrier frequency band to said color burst signal detector.

5. A chrominance signal processing apparatus for a digital television receiver, as set forth in claim 4, wherein said band pass filter has the following frequency amplitude characteristic so that the chrominance signal component of color subcarrier frequency band can be extracted from the chrominance signal from said color amplifier circuit when the clock frequency is four times as high as the color subcarrier frequency:

$$H[x]=\frac{1}{2}(1-cos2\pi fs)$$

where, fs is the clock frequency.

6. A chrominance signal processing apparatus for a digital television receiver, as set forth in claim 3, wherein said color burst signal detector includes:

an exclusive-OR gate for performing an exclusive-ORing operation with respect to the chrominance signal from said band pass filter to obtain the absolute value thereof; and a register being enabled in response to the burst gate signal to detect the absolute value of the color burst signal from the absolute value of the chrominance signal from said exclusive-OR gate in response to the clock frequency.

7. A chrominance signal processing apparatus for a digital television receiver, as set forth in claim 6, wherein said exclusive-OR gate exclusive-ORes a most significant bit of the chrominance signal from said band pass filter and the remaining bits thereof to obtain the absolute value thereof.

8. A chrominance signal processing apparatus for a digital television receiver, as set forth in claim 3, wherein said maximum value generator includes:

a comparator for comparing the absolute value of the color burst signal from said color burst signal detector with the previous absolute value of the color burst signal fed back thereto;

a multiplexer for selecting the higher one of the absolute value of the color burst signal from said color burst signal detector and the previous absolute value of the color burst signal fed back thereto in response to an output signal from said comparator;

a first register being cleared in response to the horizontal synchronous signal and for holding the selected absolute value of the color burst signal from said multiplexer in response to the clock frequency and outputting the held absolute value to said comparator and said multiplexer; and a second register for detecting the maximum amplitude value of the color burst signal from the absolute value of the color burst signal from said first register in the unit of one line in response to the horizontal synchronous signal.

9. A chrominance signal processing apparatus for a digital television receiver, as set forth in claim 3, wherein said controller includes:

a first comparator for comparing the maximum amplitude value of the color burst signal from said maximum value generator with the first reference level;

a second comparator for comparing the maximum amplitude value of the color burst signal from said maximum value generator with the second reference level;

an n-bit up/down counter for performing an up or down counting operation in the unit of one line in response to an output signal from said second comparator to output the amplification gain control signal to said color amplifier circuit; and a control signal generator for logically combining an output signal from said first comparator, the output signal from said second comparator and the amplification gain control signal from said n-bit up/down counter and outputting the combined result as a control signal to said n-bit up/down counter to control the counting operation thereof.

10. A chrominance signal processing apparatus for a digital television receiver, as set forth in claim 9, wherein the first and second reference levels are determined according to a selected amplification stage of said color amplifier circuit.

11. A chrominance signal processing apparatus for a digital television receiver, as set forth in claim 9, wherein said n-bit up/down counter performs the up-counting operation if the second reference level is higher than the maximum amplitude value of the color burst signal from said maximum value generator and the down-counting operation if the second reference level is lower than the maximum amplitude value of the color burst signal from said maximum value generator.

12. A chrominance signal processing apparatus for a digital television receiver, as set forth in claim 9, wherein said n-bit up/down counter performs the counting operation in the unit of one line whenever the horizontal synchronous signal is high in level.

13. A chrominance signal processing apparatus for a digital television receiver, as set forth in claim 9, wherein said n-bit up/down counter has a bit capacity determined according to the number of amplification stages of said color amplifier circuit.

14. A chrominance signal processing apparatus for a digital television receiver, as set forth in claim 9, wherein said n-bit up/down counter outputs the amplification gain control signal to said color amplifier circuit so that an amplification level of said color amplifier circuit can become 1, when a start signal is high in level.

15. A chrominance signal processing apparatus for a digital television receiver, as set forth in claim 9, wherein said control signal generator includes:

a first AND gate for ANDing the output signals from said first and second comparators;

a first NOR gate for NORing n bits of the amplification gain control signal from said n-bit up/down counter;

a second AND gate for ANDing the n bits of the amplification gain control signal from said n-bit up/down counter;

an inverter for inverting the output signal from said second comparator;

a third AND gate for ANDing an output signal from said inverter and an output signal from said first NOR gate;

a fourth AND gate for ANDing an output signal from said second AND gate and the output signal from said second comparator; and a second NOR gate for NORing output signals from said first, third and fourth AND gates and a vertical blanking signal and outputting the NORed result as the control signal to an enable terminal of said n-bit up/down counter.

16. A chrominance signal processing apparatus for a digital television receiver, as set forth in claim 15, wherein said second NOR gate outputs a low level signal to said n-bit up/down counter when said n-bit up/down counter is to perform the up-counting operation again in response to a high level signal from said second comparator and said n-bit up/down counter has counted up to a maximum bit value, when said n-bit up/down counter is to perform the down-counting operation again in response to a low level signal from said second comparator and said n-bit up/down counter has counted down to a minimum bit value, when the maximum amplitude value of the color burst signal is present between the first and second reference levels, or when the vertical blanking signal is high in level.

17. A chrominance signal processing apparatus for a digital television receiver, as set forth in claim 15, wherein said n-bit up/down counter stops the counting operation to hold a previous output value, when the low level signal from said second NOR gate is received at the enable terminal.

18. A chrominance signal processing apparatus for a digital television receiver, as set forth in claim 3, wherein said color amplifier circuit includes:

an amplifier for amplifying the chrominance signal at a plurality of amplification stages; and a multiplexer for selecting one of a plurality of output signals from said amplifier in response to the amplification gain control signal from said controller.

19. A chrominance signal processing apparatus for a digital television receiver, as set forth in claim 18, wherein the plurality of amplification stages of said amplifier are a combination of ½, ¼, ⅛ and ⅟₁₆.

20. A chrominance signal processing apparatus for a digital television receiver, as set forth in claim 18, wherein the plurality of amplification stages of said amplifier are 16 stages from ½ level to 2 level.

21. A chrominance signal processing apparatus for a digital television receiver, as set forth in claim 1, wherein said color killer means includes:

a band pass filter for detecting a chrominance signal component of color subcarrier frequency band from the chrominance signal from said luminance/chrominance separation means in response to the clock frequency;

a color burst signal detector for obtaining an absolute value of the chrominance signal from said band pass filter and detecting an absolute value of the color burst signal from the obtained absolute value of the chrominance signal in response to the clock frequency and a burst gate signal;

a maximum value generator for detecting the maximum amplitude value of the color burst signal from the absolute value of the color burst signal from said color burst signal detector in the unit of one line in response to the clock frequency and a horizontal synchronous signal; and a controller for comparing the maximum amplitude value of the color burst signal from said maximum value generator with the predetermined reference level and outputting the color killer signal to said first and second multiplexing means in accordance with the compared result and in response to the horizontal synchronous signal and a vertical blanking signal.

22. A chrominance signal processing apparatus for a digital television receiver, as set forth in claim 21, wherein identical ones of said band pass filter, said color burst signal detector and said maximum value generator are included in said automatic color control means.

23. A chrominance signal processing apparatus for a digital television receiver, as set forth in claim 21, wherein said controller includes:

a comparator for comparing the maximum amplitude value of the color burst signal from said maximum value generator with the predetermined reference level;

a D flip-flop for receiving the horizontal synchronous signal at a clock terminal and holding an output signal from said comparator at a rising edge of the received horizontal synchronous signal;

an n-bit up/down counter for performing an up or down counting operation in response to an output signal from said D flip-flop to output the color killer signal to said first and second multiplexing means; and a control signal generator for logically combining the output signal from said D flip-flop and the color killer signal from said n-bit up/down counter and outputting the combined result as a control signal to said n-bit up/down counter to control the counting operation thereof.

24. A chrominance signal processing apparatus for a digital television receiver, as set forth in claim 23, wherein said n-bit up/down counter outputs the color killer signal of high level when the output signal from said D flip-flop is high in level and the color killer signal of low level when the output signal from said D flip-flop is low in level.

25. A chrominance signal processing apparatus for a digital television receiver, as set forth in claim 23, wherein said n-bit up/down counter outputs a most significant bit of a count as the color killer signal.

26. A chrominance signal processing apparatus for a digital television receiver, as set forth in claim 23, wherein said control signal generator includes:

a first NOR gate for NORing n bits of an output signal from said n-bit up/down counter;

a first AND gate for ANDing the n bits of the output signal from said n-bit up/down counter;

an inverter for inverting the output signal from said D flip-flop;

a second AND gate for ANDing an output signal from said inverter and an output signal from said first NOR gate;

a third AND gate for ANDing an output signal from said first AND gate and the output signal from said D flip-flop; and a second NOR gate for NORing output signals from said second and third AND gates and the vertical blanking signal and outputting the NORed result as the control signal to an enable terminal of said n-bit up/down counter.

27. A chrominance signal processing apparatus for a digital television receiver, as set forth in claim 26, wherein said second NOR gate outputs a low level signal to said n-bit up/down counter when said n-bit up/down counter is to perform the up-counting operation again in response to a high level signal from said D flip-flop and said n-bit up/down counter has counted up to a maximum bit value, when said n-bit up/down counter is to perform the down-counting operation again in response to a low level signal from said D flip-flop and said n-bit up/down counter has counted down to a minimum bit value, or when the vertical blanking signal is high in level.

28. A chrominance signal processing apparatus for a digital television receiver, as set forth in claim 26, wherein said n-bit up/down counter stops the counting operation to hold a previous output value, when the low level signal from said second NOR gate is received at the enable terminal.

29. A method for processing a digital television signal, comprising the steps of:

(a) separating the digital television signal into a luminance signal and a chrominance signal;

(b) controlling an amplitude of the chrominance signal to form an amplitude controlled chrominance signal;

(c) detecting color difference signals from the amplitude controlled chrominance signal;

(d) generating a color killer signal based upon the chrominance signal;

(e) outputting, based upon whether the color killer signal is generated in said step (d), the digital television signal as a first output;

(f) outputting, based upon whether the color killer signal is generated in said step (d), the color difference signals of said step (c) as a second output; and (g) forwarding the first and second outputs.

30. The method for processing a digital television signal, as set forth in claim 29, wherein said step (e) outputs the luminance signal as the first output when, based upon whether the color killer signal is generated, the digital television signal is not output as the first output.

31. The method for processing a digital television signal, as set forth in claim 30, further comprising the step of:

(h) delaying the luminance signal before being output as the first output in said step (e).

32. The method for processing a digital television signal, as set forth in claim 29, wherein said step (f) outputs low level signals as the second output when, based upon whether the color killer signal is generated, the color difference signals are not output as the second output.

33. The method for processing a digital television signal, as set forth in claim 29, further comprising the steps of:

(h) converting the first and second outputs forwarded by said step (g) into analog signals; and (i) combining the analog signals to produce primary color signals; and (j) outputting the primary color signals to a monitor for display.

34. The method for processing a digital television signal, as set forth in claim 29, wherein said step (b) includes the sub-steps of:

(b-1) amplifying the chrominance signal by a predetermined level;

(b-2) band pass filtering the amplified chrominance signal in order to detect a chrominance signal component of a color subcarrier frequency band;

(b-3) detecting a first absolute value of the band pass filtered signal from said sub-step (b-2) and detecting a second absolute value of a color burst signal from the detected first absolute value;

(b-4) detecting the maximum amplitude value of the color burst signal from the second absolute value in the unit of one line; and (b-5) comparing the maximum amplitude value with first and second reference values, and outputting, based upon the comparison, an amplification gain control signal in order to vary the amplification of said sub-step (b-1).

35. The method for processing a digital television signal, as set forth in claim 29, wherein said step (d) includes the sub-steps of:

(d-1) band pass filtering the chrominance signal in order to detect a chrominance signal component of a color subcarrier frequency band;

(d-2) detecting a first absolute value of the band pass filtered signal from said sub-step (d-1) and detecting a second absolute value of a color burst signal from the detected first absolute value;

(d-3) detecting the maximum amplitude value of the color burst signal from the second absolute value in the unit of one line; and (d-4) comparing the maximum amplitude value with a reference value, and generating, based upon the comparison, the color killer signal.

* * * * *